United States Patent [19]

Wulff

[11] 3,884,230

[45] May 20, 1975

[54] FLEXIBLE NEEDLE AND GUARD DEVICE FOR A HYPODERMIC SYRINGE

[76] Inventor: Goldwyn L. Wulff, 680 Nebraska S.W., Huron, S. Dak. 57350

[22] Filed: Sept. 27, 1973

[21] Appl. No.: 401,548

[52] U.S. Cl. ............................................. 128/221
[51] Int. Cl. ............................................. A61m 5/32
[58] Field of Search ............ 128/221, 218 N, 218 D, 128/218 R, 215, 216, 218 F, DIG. 9, DIG. 5, 218 NV

[56] References Cited
UNITED STATES PATENTS

| | | | |
|---|---|---|---|
| 1,766,918 | 6/1930 | Meyer | 128/216 |
| 2,034,294 | 3/1936 | Hein | 128/215 |
| 2,674,246 | 4/1954 | Bower | 128/215 |
| 2,855,927 | 10/1958 | Henderson | 128/218 N |
| 2,876,770 | 3/1959 | White | 128/215 |
| 2,925,083 | 2/1960 | Craig | 128/218 F |
| 3,612,051 | 10/1971 | Arce | 128/215 |
| 3,749,086 | 7/1973 | Kline et al. | 128/DIG. 9 |
| 3,780,734 | 12/1973 | Wulff | 128/215 |

Primary Examiner—Richard A. Gaudet
Assistant Examiner—J. C. McGowan
Attorney, Agent, or Firm—Henderson & Strom

[57] ABSTRACT

A flexible needle and guard device for a hypodermic syringe substantially reducing the bending and breaking of needles when an innoculation is administered. The device including a flexure tube interconnected between the syringe and the needle thus permitting the needle to pivot laterally, and a guard mounted on the syringe and over the needle, wherein the guard has a spring disposed therein to bias the needle in axial alignment with the syringe.

10 Claims, 4 Drawing Figures

FLEXIBLE NEEDLE AND GUARD DEVICE FOR A HYPODERMIC SYRINGE

BACKGROUND OF THE INVENTION

Livestock often require drug innoculations to prevent the spread of disease. Such an innoculation is commonly administered by leading the aniaml into a specially constructed chute wherein the animal is clamped by a moveable wall. Once the animal is clamped, the innoculation may be administered by a manually operated syringe. Obiously this procedure is time consuming as the animal must be brought to the chute. The delay depends on the distance the animal must travel, and in some cases (particularly on a large ranch) may involve days. In addition, the special chutes often injure the animal or frighten the animal.

Various methods of innoculating livestock without such a special chute, such as using a dart gun, or unaided innoculation have similar disadvantages. In particular, a dart gun having a syringelike projectile is often used to tranquilize wild game for capture, however such a procedure is inordinately expensive to use on livestock. Although livestock are commonly considered tame, an unaided innoculation exposes the person holding the syringe to the danger that the startled animal will kick and physically injure the person. If the animal kicks or otherwise moves, the needle often cuts the flesh or hide of the animal, or the needle may bend or break.

Furthermore, the needle of a standard syringe is slidably mounted on the syringe and if the animal does move or if the needle becomes lodged in the animal, the needle may be pulled from the syringe.

A lodged needle must be removed at considerable risk to the operator, and if the needle merely falls to the ground it may not readily be found or the dangerous environment may not justify recovery.

SUMMARY OF THE INVENTION

The flexible needle and guard device for a hypodermic syringe of this invention substantially reduces the bending and breaking of needles during the innoculation of an animal as caused by the startle reflex of the animal when the needle punctures the hide. The device including a flexure tube interconnected between the syringe and the needle thus permitting the needle to pivot laterally on the syringe, and a guard mounted on the syringe and over the needle. The guard has a conical shaped helical spring disposed therein which operates to align the needle coaxial to the syringe but which permits the needle to pivot. The guard further secures the needle to the syringe thus preventing loss therof.

It is therefore the object of this invention to provide a flexible needle and guard device for a hypodermic syringe which substantially reduces the possibility of breaking or bending the needle in the event the animal to be innoculated moves during the administering of the innoculation.

Another object of this invention is the provision of a guard device for the needle of a hypodermic syringe to bias the needle in coaxial alignment with the syringe, to prevent loss of the needle from the syringe, and to reduce the possibility of tearing the flesh of the animal during the innoculation procedure.

Still another object of the invention is to provide a flexible hypodermic syringe which is simple of construction, economical to manufacture, extremely functional in use, and durable of construction.

These objects and other features and advantages become readily apparent upon reference to the following description when taken in conjunction with the appended drawings.

In the drawings as hereinafter described, a preferred embodiment of the invenion is depicted; however various modifications and alternate construction can be made thereto without departing from the true spirit and scope of the invention.

DESCRIPTION OF THE PREFERRED EMBODIMENT

Figures 1, 2:
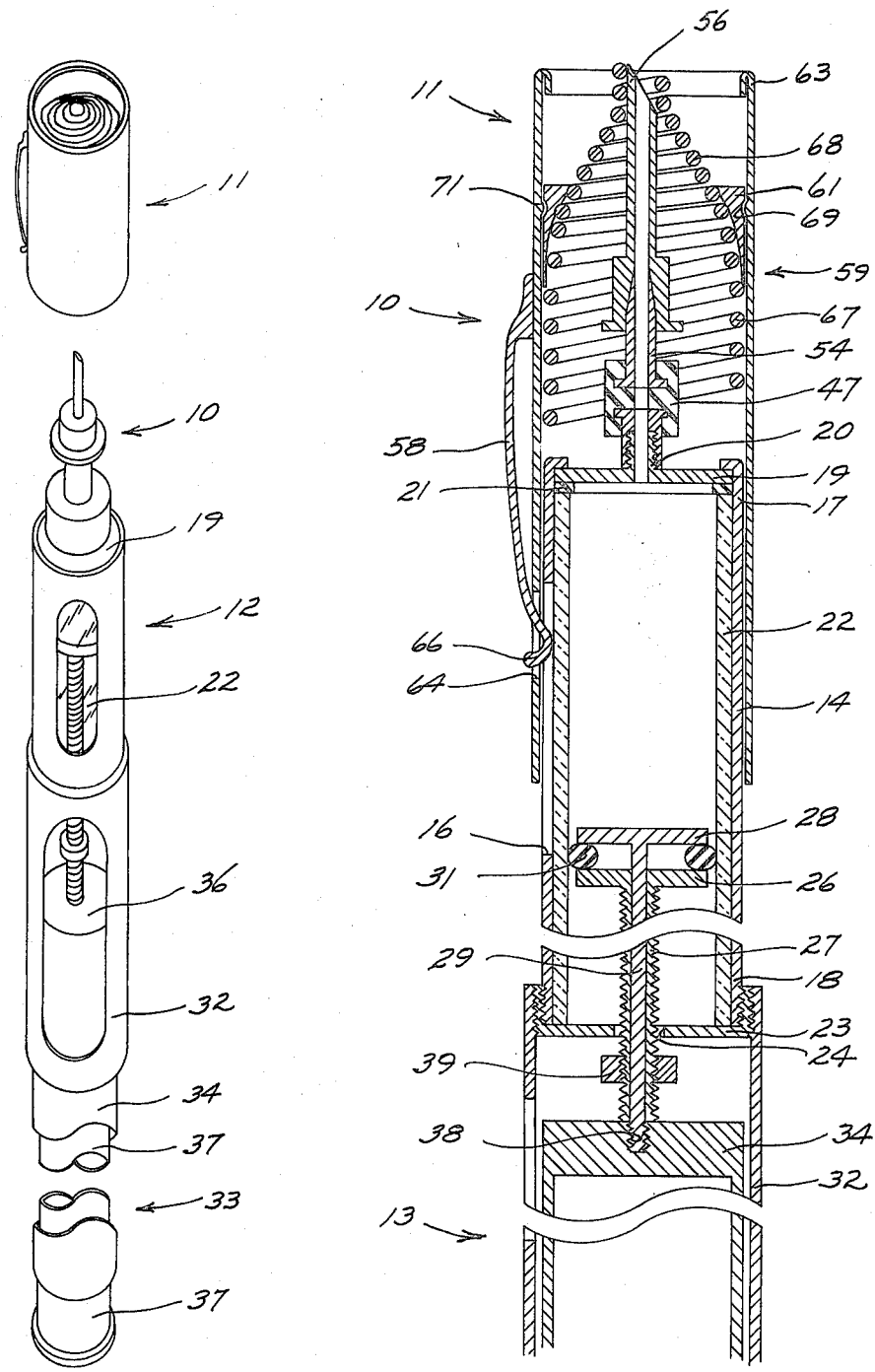
FIG. 1 is a perspective view of a hypodermic syringe holder having a flexible needle and guard device, wherein the guard device is not mounted on the syringe.
FIG. 2 is a partial sectional view thereof with the guard device disposed over the syringe barrel.

Referring now to the drawings and in particular to FIGS. 1 and 2, the flexible needle 10 and guard device 11 of this invention are mounted on a conventional hypodermic syringe 12 which is disposed in the holder 13. The syringe 12, for animal husbandry, includes a metallic hollow cylindrical barrel 14, having at least one slot 16 formed therein for the purpose of allowing observation. The outlet end 17 of the barrel is flanged inwardly and the operator end 18 is provided with external threads cut into the outer surface thereof. Disposed across the barrel against the flanged end is a disk 19 having an integral nozzle 20 projecting axially therefrom, and separated from the disk 19 by a washer 21 is a glass tube 22. Threadably mounted on the operator end 18 is a cap 23 having an axial opening 24 formed therein. The outer surfaces of the cap 23 and the nozzle 20 are threaded.

Slidably mounted within the glass tube 22 (FIG. 2) is a plunger 26, a hollow plunger rod 27 secured on one end to the plunger with the other end thereof projecting rearwardly through the opening 24, a compression disk 28 spaced from the plunger, a compression rod 29 secured on one end to the compression disk and disposed in the plunger rod, and sealing ring 31 disposed between the plunger and the compression disk. Disposed rearwardly of the cap 23 is the holder 13 (FIG. 1) which includes a tubular element 32 threadably secured to the cap 23. Slidably mounted in the element 32 is a telescoping handle unit 33 comprising an outer handle 34 having a closed bottom end 36 and an inner handle 37. The closed end 36 has an axial tapped hold 38 (FIG. 2) in which the other end of the compression rod 29 is threadably mounted. It will be noted that the other end of the plunger rod 27 seats against the handle bottom end 36 wherein clockwise rotation of the outer handle forces the disk 28 toward the plunger 26 thus causing the seal ring 31 to expand radially outwardly against the tube 22. The amount of compression placed on the ring 31 controls the amount of pressure required to move the plunger in the tube 22. Threadably disposed on the rod 27 is a nut 39 for limiting the axial movement of the plunger 26 in the glass tube 22.

Threadably secured to the disk 19 (FIGS. 2 and 3) is one end of a connector 42. The connector is coaxial with the disk 19 and has a conduit 43 formed therethrough which is fluidly communicable with the nozzle 20. The other end of the connector has a radial flange 46. Secured to the connector 42 and projecting axially therefrom is a flexible tube 47 having an opening 48 formed therethrough. The opening is reamed to form a cavity 49 and an annular indent 51 is provided in the inner periphery of the tube 47 at the base of the cavity 49 to provide a seat for the connector flange 46. A similar cavity and indent is formed in the other end of the connector for receiving the flanged end of a needle retainer 54. Frictionally mounted on the retainer is a conventional needle 56.

Slidably mounted on the barrel 14 outlet end 17 (FIGS. 3 and 4) is the guard devices 11 comprising a tube section 57, a leaf spring 58, a helical spring 59, and a collar 61. The inner wall of one end 62 of the tube section 57 slidably engages the outer wall of the barrel 14. The other end 63 of the tube section 57 is rolled inwardly to eliminate all sharp outer surfaces of the section 57. Secured to the outer wall of the section 57 is the leaf spring 58 which projects rearwardly toward the barrel. A slot 64 (FIG. 2) is cut through the wall of the tube section and the free end 66 of the leaf spring projects therethrough to slidably engage the glass tube 22 via the slot 16 of the barrel 14. The purpose of the leaf spring is to detachably secure the guard device 11 to the barrel 14.

The helical spring 59 is formed into two segments 67 and 68. The first segment 67 is cylindrical in form and is integral with the base of the second segment 68. The second segment is conical in shape with the apex projecting slightly forward of the tube section other end 63. Secured to the spring 59, as by welding, at the interconnection of the two segments is the collar 61. The free end of the first segment 67 coacts with the flanged outlet end 19 of the barrel 14 while the free end of the second segment is disposed slightly behind the forward end of the needle 56. The collar 61 is cylindrical in shape and has an annular indent 69 formed in the periphery thereof. An annular ridge 71 is stamped in the tube section and receives the collar indent 69 for securing the spring 59 in position in the tube section. It will be noted in the figures that the helical spring 59 substantially encompasses the needle 56.

The guard device 11 is slidably moveable on the barrel from a first position wherein the needle is substantially encompassed to a second position, against the bias of the first segment 67 of the helical spring 59, wherein the needle 56 projects axially of the guard device. The second segment 68 of the helical spring 59 maintains the needle in coaxial alignment with the barrel 14 however the needle 56 will pivot against the bias of the second segment 68. The proper sequences of operation requires that the amount of pressure required to move the guard device 11 to the second position is at least slightly less than the amount of the pressure required to move the plunger forwardly in the glass tube toward the needle end thereof. To adjust the amount of pressure required to move the plunger, the expansion of the compression ring by the coaction of the compression disk 28 and the plunger 26 is altered as hereinabove described.

In operation the needle 56 is frictionally affixed to the needle retainer 54, the plunger is moved forwardly in the glass tube 22 to expel the air therein, the needle is inserted into a bottle (not shown) containing the innoculant and the plunger is moved rearwardly thus filling the tube with innoculant, the needle guard is slidably affixed to the barrel and the syringe is now ready for use with the needle protected by the guard which also prevents it from becoming disengaged while not in use (FIG. 2).

Figure 3:
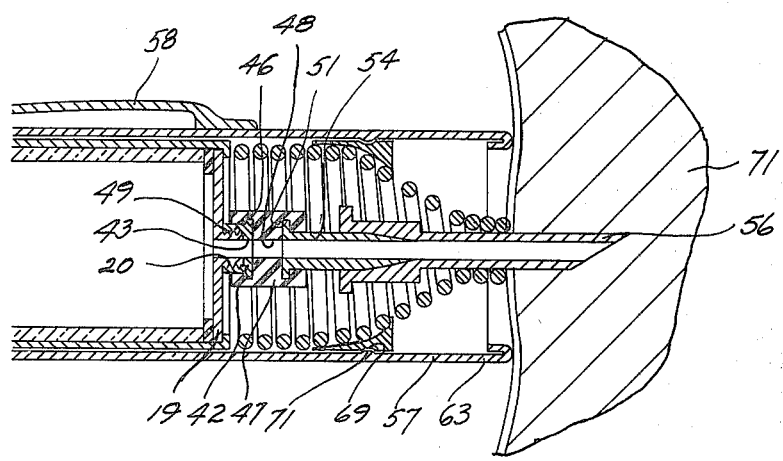
FIG. 3 is a partial sectional view similar to FIG. 2 with the needle disposed in the hide of an animal.
Figure 4:
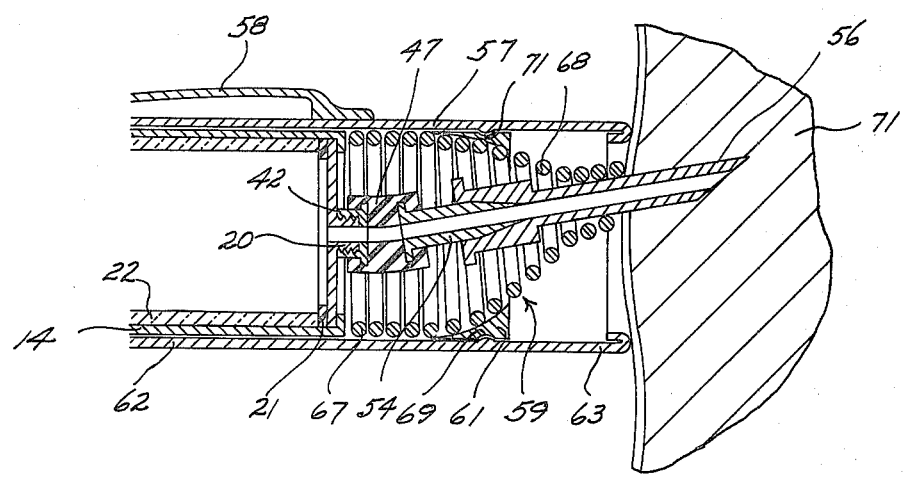
FIG. 4 is similar to FIG. 3 with the needle flexed.

The animal is approached and the outer end of the needle guard is placed against the hide of the animal 71. Simultaneously with the positioning of the guard the handle unit is pushed toward the syringe which simultaneously causes the needle guard to slide rearwardly on the barrel against the longitudinal bias of the helical spring 59 and to push the needle 56 into the animal 71 (FIG. 3). At substantially the same time the plunger is caused to move toward the disk 19 thus forcing the innoculant through the nozzle 20, the connector 42, the flexible tube 47, the needle retainer 54, the needle 56, and into the animal 71.

Startle reflexes of the animal 71 may cause the animal to move slightly before the needle is removed from the animal (FIG. 4) Such movement is compensated for by the flexible tube 47 wherein the needle will pivot against the lateral bias of the helical spring 59. Upon removal of the needle from the animal the spring 59 causes the needle to return to its coaxial alignment with the syringe 12. In the event the needle 56 is pulled from its retainer 54 the apex of the second segment 68 of the spring 59 acts as a stop to prevent the needle from remaining in the animal or from dropping to the ground.

It will be noted that the second segment 68 of the helical spring 59 is required to maintain the needle in coaxial alignment with the connector. In the absence of the second segment it has been found that the needle is deflected before it penetrates the hide thus at least partially negating the effectiveness of the innoculation.

I claim:

1. A flexible needle and guard device for a hypodermic syringe having a barrel for holding an innoculant, a nozzle connected to said barrel through which said innoculant is ejected, and a plunger slidably disposed in said barrel for ejecting said innoculant; said flexible needle and guard device comprising:

an elongated hollow connector secured on one end to said nozzle and having the other end thereof projecting axially of said nozzle;

a flexible tube having one end secured to said other end of said connector and having a second end projecting axially of said connector;

an elongated hollow needle retainer secured on one end to said second end of said tube and having the other end projecting axially of said tube, said retainer spaced from said connector;

a hollow needle detachably secured to said other end of said retainer and coaxially aligned in one position with said connector wherein said needle is pivotable from said one position to another position angularly inclined to said connector; and a first biasing means operably connected between said barrel and said needle for biasing said needle to said one position.

2. A flexible needle and guard device for a hypodermic syringe as defined in claim 1 including a guard tube having one end thereof slidably mounted on said barrel, having the other end thereof projecting axially of said barrel, and having said first biasing means mounted therein; said guard tube being movable from a first position substantially encompassing said needle to a second position wherein a portion of said needle projects outwardly from said guard tube other end.

3. A flexible needle and guard device for a hypodermic syringe as defined in claim 2 wherein said first biasing means is a conical shaped helical spring through which said needle projects.

4. A flexible needle and guard device for a hypodermic syringe as defined in claim 2 including a second biasing means which is mounted in said guard tube and is coactable with said barrel, wherein said guard tube is moveable from said first position to said second position against the bias of said second biasing means.

5. A flexible needle and guard device for a hypodermic syringe as defined in claim 4 wherein said second biasing means is a helical spring having one end disposed against said barrel and having the other end connected to said conical spring, and including a collar connected to said springs and to said guard tube.

6. A flexible needle and guard device for a hypodermic syringe as defined in claim 5 including a holding means secured to said guard tube and operably connected to said barrel.

7. A flexible needle and guard device for a hypodermic syringe as defined in claim 6 wherein said guard tube other end is rolled inwardly to provide a smooth peripheral edge.

8. A flexible needle and guard device for a hypodermic syringe as defined in claim 6 wherein said holding means is a leaf spring having one end secured to said guard tube and having a free end frictionally engaging said barrel.

9. A flexible needle and guard device for a hypodermic syringe as defined in claim 8 wherein said guard tube has a slot formed in the wall thereof and said leaf spring free end projects therethrough.

10. A flexible needle and guard device for a hypodermic syringe as defined in claim 9 wherein said guard tube other end is rolled inwardly to provide a smoother peripheral edge.

* * * * *